US012015902B2

(12) United States Patent
Fukui

(10) Patent No.: US 12,015,902 B2
(45) Date of Patent: Jun. 18, 2024

(54) ECHO CANCELLATION DEVICE, ECHO CANCELLATION METHOD, AND PROGRAM

(71) Applicant: NIPPON TELEGRAPH AND TELEPHONE CORPORATION, Tokyo (JP)

(72) Inventor: Masahiro Fukui, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 189 days.

(21) Appl. No.: 17/632,852

(22) PCT Filed: Aug. 6, 2019

(86) PCT No.: PCT/JP2019/030866
§ 371 (c)(1),
(2) Date: Feb. 4, 2022

(87) PCT Pub. No.: WO2021/024373
PCT Pub. Date: Feb. 11, 2021

(65) Prior Publication Data
US 2022/0329940 A1 Oct. 13, 2022

(51) Int. Cl.
*H04R 3/02* (2006.01)

(52) U.S. Cl.
CPC .................................... *H04R 3/02* (2013.01)

(58) Field of Classification Search
None
See application file for complete search history.

(56) References Cited

U.S. PATENT DOCUMENTS

| | | | | |
|---|---|---|---|---|
| 8,447,595 B2 * | 5/2013 | Chen | ........................ | G10L 21/02 704/226 |
| 8,792,649 B2 * | 7/2014 | Yano | ..................... | H04M 9/082 379/406.01 |

(Continued)

FOREIGN PATENT DOCUMENTS

| | | |
|---|---|---|
| JP | 5087024 B2 | 11/2012 |
| JP | 2014150368 A | 8/2014 |
| WO | 2019044176 A1 | 3/2019 |

OTHER PUBLICATIONS

Fukui et al. (2009) "Accurate Echo Power Estimation Forecho Reduction" IEICE General Conference, Mar. 4, 2009.

*Primary Examiner* — Qin Zhu

(57) ABSTRACT

Provided is an echo cancellation apparatus capable of calculating an acoustic coupling amount with high accuracy regardless of the magnitude of the near-end speaker component and without using a double talk detector. The echo cancellation apparatus cancels an echo included in a sound pickup signal picked up by a microphone placed at a near-end and includes an acoustic coupling amount calculation unit that updates and calculates an acoustic coupling amount estimated value of a component of a reproduction signal, which is a signal picked up by a microphone placed at a far-end included in the sound pickup signal, such that an update amount is decreased the greater a magnitude of a component other than an echo component is in the sound pickup signal; a gain calculation unit that calculates a gain coefficient on the basis of the acoustic coupling amount estimated value; and an integration unit that integrates the gain coefficient with the sound pickup signal and generates an echo cancellation signal.

13 Claims, 5 Drawing Sheets

(56) References Cited

U.S. PATENT DOCUMENTS

| | | | | |
|---|---|---|---|---|
| 2011/0135105 | A1* | 6/2011 | Yano | H04B 3/235 381/66 |
| 2011/0301948 | A1* | 12/2011 | Chen | G10L 25/78 704/E19.039 |
| 2012/0237047 | A1* | 9/2012 | Neal | H04M 9/082 381/66 |
| 2021/0195324 | A1 | 6/2021 | Tateishi | |

* cited by examiner

ECHO CANCELLATION DEVICE, ECHO CANCELLATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/030866, filed on 6 Aug. 2019, the disclosure of which is hereby incorporated herein by reference in its entirety.

TECHNICAL FIELD

The invention relates to an echo cancellation apparatus, an echo cancellation method, and a program used in a teleconferencing system, for example, including a sound reproduction system that cancels acoustic echo that is caused by howling and that may cause auditory damage.

BACKGROUND ART

Echo suppression processing based on short-time spectral amplitude (STSA) estimation is implemented by subtracting an echo amplitude component in a frequency domain utilizing the characteristic that human hearing is insensitive to phase and the statistical characteristics of echo. For example, a conventional echo cancellation apparatus 100 that suppresses echo in a frequency domain is described in PTL 1 and NPL 1.

FIG. 1 is a diagram for illustrating an example of the functional configuration of the echo cancellation apparatus 100 and for describing the operations thereof. Signals input to the echo cancellation apparatus 100 include a reproduction signal x(n) input at a receiver end 1 that is converted to an audio signal by a speaker 2 and a sound pickup signal y(n) output by a microphone 3. The sound pickup signal y(n) is the reproduction signal x(n) converted to an audio signal superimposed with an echo component effect effected by a room impulse response (transfer function), not illustrated.

An output signal s^(n) output to a transmitter end 4 of the echo cancellation apparatus 100 is a signal with an echo component of the sound pickup signal y(n) suppressed and a near-end speaker signal s(n) is strengthened. Note that the receiver end 1 receives a signal transmitted by the far-end, and the transmitter end 4 transmits a signal with a suppressed echo component to the far-end. The receiver end 1, the transmitter end 4, the speaker 2, and the microphone 3 are all installed at the near-end.

The echo cancellation apparatus 100 includes a first frequency analysis unit 101, a second frequency analysis unit 102, an acoustic coupling amount calculation unit 103, an echo power calculation unit 104, again calculation unit 105, an integration unit 106, and a frequency combining unit 107.

The first frequency analysis unit 101 executes frequency analysis on the input reproduction signal x(n) and outputs a reproduction signal spectrum $X_i(\omega)$ (step S101).

The second frequency analysis unit 102 executes frequency analysis on the input sound pickup signal y(n) and outputs a sound pickup signal spectrum $Y_i(\omega)$ (step S102). Herein, n is the number of sample points indicating predetermined intervals of discrete time, and the reproduction signal x(n) and the sound pickup signal y(n) are digital signals. In FIG. 1, an A/D converter that converts an analog signal input to the speaker 2 and output to the microphone 3 into a digital signal is omitted.

The ω in the reproduction signal spectrum $X_i(\omega)$ and the sound pickup signal spectrum $Y_i(\omega)$ is a frequency value and is the number of the frequency of the spectrum obtained via a predetermined frequency interval. Also, i is a frame number. The duration of a frame is 16 ms in a case where the sampling frequency is 16 Hz and the data amount of the frequency analysis is 256 points, for example.

The acoustic coupling amount calculation unit 103 is input with the reproduction signal spectrum $X_i(\omega)$ and the sound pickup signal spectrum $Y_i(\omega)$ and outputs an estimated value $|H\hat{}_{m,i}(\omega)|^2$ (hereinafter, referred to as a first acoustic coupling amount estimated value) of the acoustic coupling amount (step S103). The acoustic coupling amount is a value representing the acoustic magnitude of the echo path from the speaker 2 to the microphone 3. A first acoustic coupling amount estimated value $|H\hat{}_{m,i}(\omega)|^2$ is calculated via Formula (1).

[Math. 1]

$$|\hat{H}_{m,i}(\omega)|^2 = \left|\frac{\langle X^*_{i-m}(\omega),\ Y_i(\omega)\rangle}{\|X^*_{i-m}(\omega)\|^2}\right|^2 \quad (1)$$

Here, * represents a complex conjugate. The subscript m corresponds to the frame corresponding to the impulse response length of the echo path and takes an integer value of m=0, 1, . . . , M−1. M represents the frame number corresponding to the impulse response length of the echo path. <, > represents the inner product and $\|\bullet\|^2$ is the norm square. The acoustic coupling amount calculation unit 103 calculates the inner product $\langle X\hat{}_{i-m}(\omega), Y_i(\omega)\rangle$ of the reproduction signal spectrum and the sound pickup signal spectrum via Formula (2), for example, and the norm value $\|X_{i-m}(\omega)\|^2$ of the reproduction signal spectrum via Formula (3), for example.

[Math. 2]

$$\langle X_{i-m}{}^*(\omega), Y_i(\omega)\rangle = \varepsilon|X_{i-m}{}^*(\omega), Y_i(\omega)| + (1-\varepsilon)\langle X_{i-m-1}{}^*(\omega), Y_{i-1}(\omega)\rangle \quad (2)$$

$$\|X_{i-m}(\omega)|^2 = \varepsilon|X_{i-m}(\omega)|^2 + (1-\varepsilon)\|X_{i-m-1}(\omega)\|^2 \quad (3)$$

Here, ε is a forgetting factor satisfying 0<ε≤1 that determines the time constant of exponential decay. For example, ε=0.01. The closer ε is to 1, the more the (weighted) values are dependent on the current reproduction signal spectrum $X_i(\omega)$ and the sound pickup signal spectrum $Y_i(\omega)$.

The echo power calculation unit 104 is input with the reproduction signal spectrum $X_i(\omega)$ and the acoustic coupling amount estimated value $|H\hat{}_{m,i}(\omega)|^2$ and calculates an echo power estimated value $|D\hat{}_i(\omega)|^2$ (referred to as a first echo power estimated value below) via Formula (4) (step S104).

[Math. 3]

$$|\hat{D}_i(\omega)|^2 = \Sigma_{m=0}^{M-1}|\hat{H}_{m,i}(\omega)|^2|X_{i-m}(\omega)|^2 \quad (4)$$

The gain calculation unit 105 is input with the first echo power estimated value $|D\hat{}_i(\omega)|^2$ and the sound pickup signal spectrum $Y_i(\omega)$ and calculates a gain coefficient $G_i(\omega)$ (referred to as a first gain coefficient below) via Formula (5) (step S105).

[Math. 4]

$$G_i(\omega) = \frac{|Y_i(\omega)|^2 - |\hat{D}_i(\omega)|^2}{|Y_i(\omega)|^2} \quad (5)$$

The first gain coefficient $G_i(\omega)$ is an actual numerical value from 0 to 1 and, in a case where there is a large echo component in the sound pickup signal spectrum $Y_i(\omega)$, is a smaller value and, in a case where there is a small echo component in the sound pickup signal spectrum $Y_i(\omega)$, is a greater value.

The integration unit 106 integrates the first gain coefficient $G_i(\omega)$ with the sound pickup signal spectrum $Y_i(\omega)$ and outputs an echo cancellation signal spectrum $S\hat{}_i(\omega)$ (referred to as a first echo cancellation signal spectrum below) (step S106).

The frequency combining unit 107 recombines and outputs the output signal $s\hat{}(n)$ of the time domain from the first echo cancellation signal spectrum $S\hat{}_i(\omega)$ corresponding to the frequency value $\omega$ (step S107).

CITATION LIST

Patent Literature

[PTL 1] Japanese Patent No. 5087024

Non Patent Literature

[NPL 1] A-4-18 Accurate Echo Power Estimation For Echo Reduction (A-4. Signal Processing, General Session); Proceedings of The Institute of Electronics, Information, and Communication Engineers General Conference, pg. 122, published Mar. 4, 2009.

SUMMARY OF THE INVENTION

Technical Problem

The echo cancellation apparatus 100 is capable of estimating an acoustic coupling amount corresponding to an impulse response length of an echo path by obtaining, as a first acoustic coupling amount estimated value, a coupling amount obtained by shifting a reproduction signal spectrum with respect to a sound pickup signal spectrum to the past. In other words, because the reproduction signal of a certain frame and the reproduction signal of a different frame are statistically not correlated, an acoustic coupling amount of the echo path of a previous frame with the non-correlated component removed is extracted from a cross spectrum sum value of the reproduction signal of a previous time and the sound pickup signal of a frame of the current time. However, the effects when, not only an echo component, but also a near-end speaker component is included in the sound pickup signal spectrum are not considered in Formula (1). Thus, in a conventional echo cancellation apparatus, an incorrect estimation of the acoustic coupling amount may occur. As a result, when the far-end and the near-end are simultaneously talking (double talk), the echo power cannot be accurately estimated, which is one cause of musical noise.

A plausible approach to this is to use a double talk detector that detects whether or not there is a state of double talk and to stop estimating the acoustic coupling amount in the section when double talk is detected. However, there are many cases where employing double talk detection to typically acoustic coupling amount estimation is not desirable. This is because many double talk detectors need to estimate the echo component to detect a near-end speaker component included in the sound pickup signal. To estimate the echo component, acoustic coupling amount estimation is necessary. Thus, in a case where a double talk detector is employed for acoustic coupling amount estimation, the double talk detection and the acoustic coupling amount estimation may be in a state which each one is included in the other, causing a dead-lock.

In regards to this, the present invention is directed at providing an echo cancellation apparatus capable of calculating an acoustic coupling amount with high accuracy regardless of the magnitude of the near-end speaker component and without using a double talk detector.

Means for Solving the Problem

An echo cancellation apparatus of the present invention cancels an echo included in a sound pickup signal picked up by a microphone placed at a near-end and includes an acoustic coupling amount calculation unit, a gain calculation unit, and an integration unit.

The acoustic coupling amount calculation unit updates and calculates an acoustic coupling amount estimated value of a component of a reproduction signal, which is a signal picked up by a microphone placed at a far-end included in the sound pickup signal, such that an update amount is decreased the greater a magnitude of a component other than an echo component is in the sound pickup signal. The gain calculation unit calculates a gain coefficient on the basis of the acoustic coupling amount estimated value.

The integration unit integrates the gain coefficient with the sound pickup signal and generates an echo cancellation signal.

Effects of the Invention

According to an echo cancellation apparatus of the present invention, an acoustic coupling amount can be calculated with high accuracy regardless of the magnitude of the near-end speaker component and without using a double talk detector.

DESCRIPTION OF EMBODIMENTS

An embodiment of the present invention will be described in detail below. Note that components with the same function are given the same number, and redundant descriptions are omitted.

First Embodiment

Figure 1:
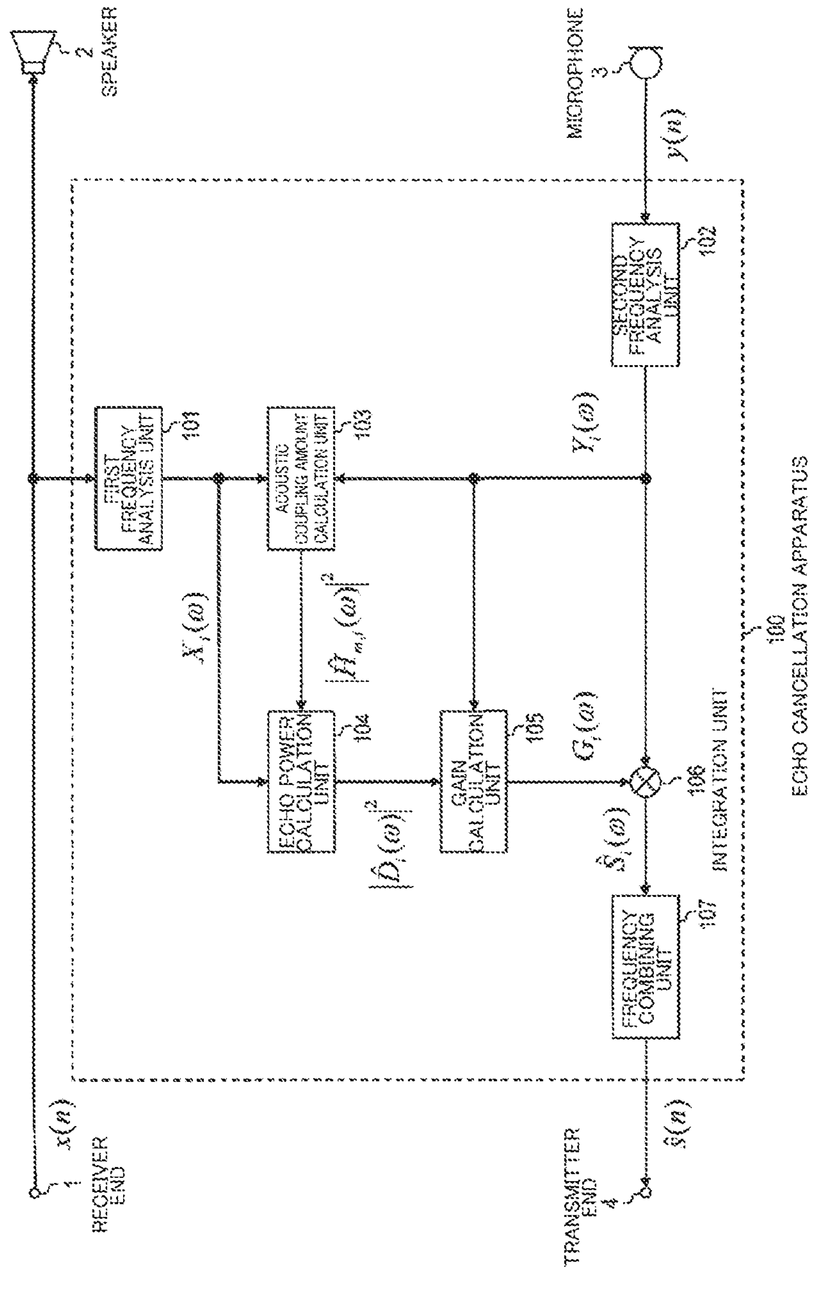
FIG. 1 is a block diagram illustrating the configuration of a conventional echo cancellation apparatus.
Figure 2:
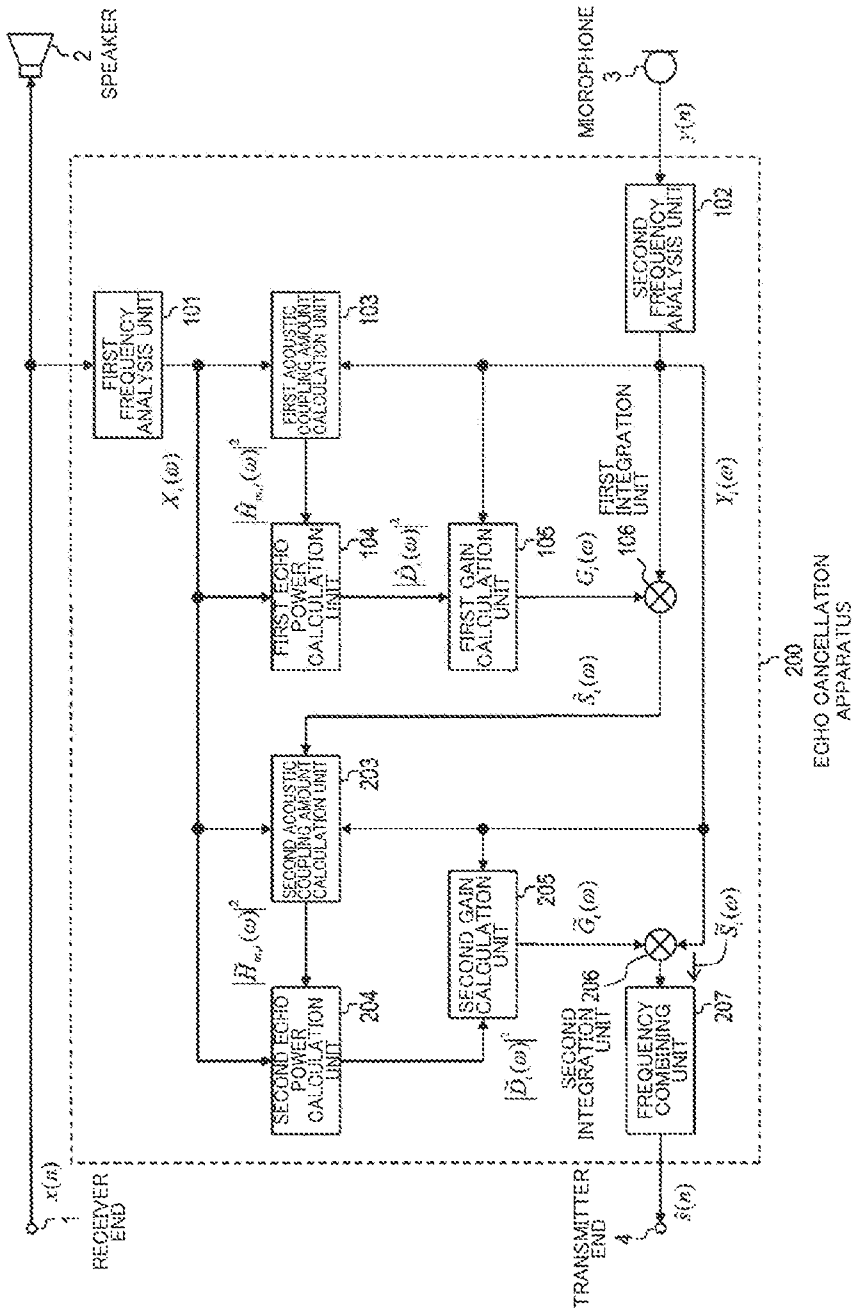
FIG. 2 is a block diagram illustrating the configuration of an echo cancellation apparatus of a first embodiment.
Figure 3:
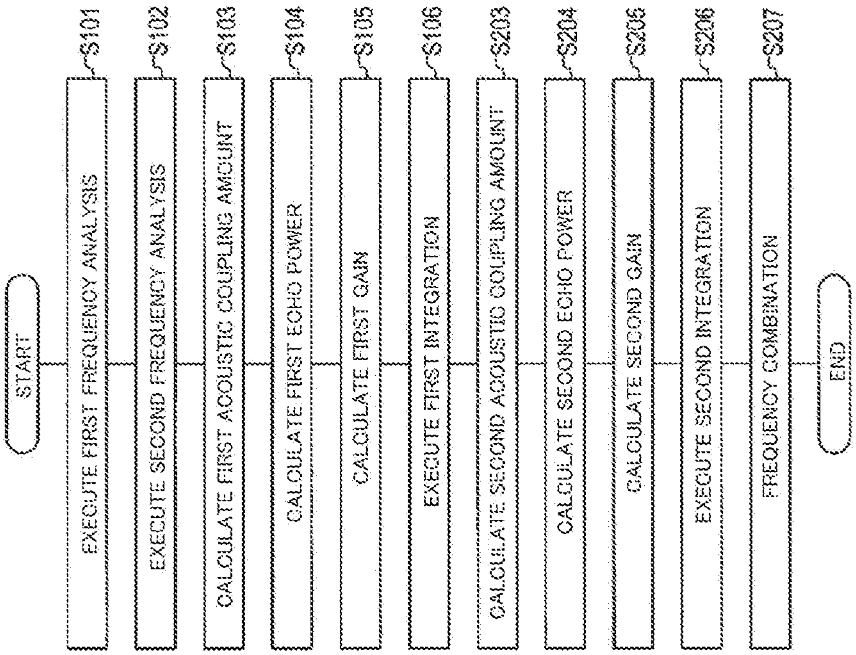
FIG. 3 is a flowchart illustrating the operations of the echo cancellation apparatus of the first embodiment.

The configuration of an echo cancellation apparatus according to the first embodiment will be described below with reference to FIG. 2. As illustrated in FIG. 2, an echo cancellation apparatus 200 of the present embodiment includes a first frequency analysis unit 101, a second frequency analysis unit 102, a first acoustic coupling amount calculation unit 103, a first echo power calculation unit 104, a first gain calculation unit 105, a first integration unit 106, a second acoustic coupling amount calculation unit 203, a second echo power calculation unit 204, a second gain calculation unit 205, a second integration unit 206, and a frequency combining unit 207. The echo cancellation apparatus 200 is implemented by a predetermined program being loaded into a computer constituted by a ROM, a PAM, a CPU, and the like and the CPU executing the program.

The second acoustic coupling amount calculation unit 203, the second echo power calculation unit 204, the second gain calculation unit 205, the second integration unit 206, and the frequency combining unit 207 are additional elements. The other elements, i.e., the first frequency analysis unit 101, the second frequency analysis unit 102, the first acoustic coupling amount calculation unit 103, the first echo power calculation unit 104, the first gain calculation unit 105, and the first integration unit 106 have the same function as the first frequency analysis unit 101, the second frequency analysis unit 102, the acoustic coupling amount calculation unit 103, the echo power calculation unit 104, the gain calculation unit 105, and the integration unit 106 of the conventional, echo cancellation apparatus 100.

The operations of the additional configuration requirements not included in the related art will be described in the detail below.

<Second Acoustic Coupling Amount Calculation Unit 203>

The second acoustic coupling amount calculation unit 203 updates and calculates an acoustic coupling amount estimated value (a second acoustic coupling amount estimated value $|H\hat{}_{m,i}(\omega)|^2$, described below in detail) of a component of a reproduction signal, which is a signal included in the sound pickup signal spectrum $Y_i(\omega)$ picked up by the microphone placed at the far-end so that the update amount is decreased the greater the magnitude of components other than the echo component is in the sound pickup signal spectrum $Y_i(\omega)$ (step S203). Note that the components other than the echo component indicates disturbance (normal noise, abnormal noise) of the near-end and particularly indicates abnormal noise of the disturbance of the near-end.

This is assuming that normal noise has been cancelled in advance by noise reduction or the like, not illustrated. However, the components other than the echo component may take into account abnormal noise and a component of normal noise that leaked through cancellation.

The conventional acoustic coupling amount estimation formula represented by Formula (1) is expanded in Formula (6).

[Math. 5]

$$
\begin{aligned}
\left|\hat{H}_{m,i}(\omega)\right|^2 &= \left|\frac{\langle X^*_{i-m}(\omega),\, Y_i(\omega)\rangle}{\|X^*_{i-m}(\omega)\|}\right|^2 \qquad (6)\\
&= \left|\frac{X'_{i-m}(\omega)Y_i(\omega) + X'_{i-m-1}(\omega)Y_{i-1}(\omega) + X'_{i-m-2}(\omega)Y_{i-2}(\omega) + \dots}{\|X_{i-m}(\omega)\|^2}\right|^2\\
&= \left|\frac{X'_{i-m}(\omega)Y_i(\omega)}{\|X_{i-m}(\omega)\|^2} + \frac{X'_{i-m-1}(\omega)Y_{i-1}(\omega) + X'_{i-m-2}(\omega)Y_{i-2}(\omega) + \dots}{\|X_{i-m}(\omega)\|^2}\right|^2\\
&= \left|\frac{\frac{|X_{i-m}(\omega)|^2}{|X_{i-m}(\omega)|^2}\frac{Y_i(\omega)}{X_{i-m}(\omega)} + |X_{i-m-1}(\omega)|^2 + |X_{i-m-2}(\omega)|^2 + \dots}{\|X_{i-m}(\omega)\|^2}\,\frac{X'_{i-m-1}(\omega)Y_{i-1}(\omega) + X'_{i-m-2}(\omega)Y_{i-2}(\omega) + \dots}{|X_{i-m-1}(\omega)|^2 + |X_{i-m-2}(\omega)|^2 + \dots}\right|^2\\
&= \left|\frac{\frac{|X_{i-m}(\omega)|^2}{|X_{i-m}(\omega)|^2}\frac{Y_i(\omega)}{X_{i-m}(\omega)} + |X_{i-m-1}(\omega)|^2 + |X_{i-m-2}(\omega)|^2 + \dots}{\|X_{i-m}(\omega)\|^2}\,\frac{\langle X^*_{i-m-1}(\omega),\, Y_{i-1}(\omega)\rangle}{\|X^*_{i-m}(\omega)\|^2}\right|^2\\
&= \left|\mu_{i-m,n}\frac{Y_i(\omega)}{X_{i-m}(\omega)} + (1-\mu_{i-m,\omega})\overrightarrow{H}_{m,j-1}(\omega)\right|^2
\end{aligned}
$$

As seen in Formula (6), by factoring out the acoustic coupling amount estimated value of one frame previous from the conventional acoustic coupling amount estimation formula, the acoustic coupling amount estimation formula can be substituted with an updated formula with step size. The step size $\mu_{i-m,\omega}$ in Formula (6) is represented by Formula (7).

[Math. 6]

$$
\mu_{i-m,\omega} = \frac{|X_{i-m}(\omega)|^2}{\|X_{i-m}(\omega)\|^2} \qquad (7)
$$

With the acoustic coupling amount estimation formula obtained by expanding Formula (6), step size control in which the update amount for each frame can be changed is possible. The second acoustic coupling amount calculation unit 203 is capable of determining the update amount by controlling the step size. Note that in the related art, updating is able to stopped by using a configuration in which the step size is controlled when updating should be continued.

The second acoustic coupling amount calculation unit 203 is input with the reproduction signal spectrum $X_i(\omega)$, the sound pickup signal spectrum $Y_i(\omega)$, and an echo cancellation signal spectrum $S\hat{}(\omega)$ and calculates the second acoustic coupling amount estimated value $|H\hat{}_{m,i}(\omega)|^2$ via Formula (8), for example (step S203).

[Math. 7]

$$|\tilde{H}_{m,i}(\omega)|^2 = \left| \frac{\mu_{i-m,\omega}}{\sigma[\hat{S}_i(\omega)]} \cdot \frac{Y_i(\omega)}{X_{i-m}(\omega)} + \left(1 - \frac{\mu_{i-m,\omega}}{\sigma[\hat{S}_i(\omega)]}\right)\tilde{H}_{m,i-1}(\omega) \right|^2 \quad (8)$$

Here, $\sigma[S^{\wedge}_i(\omega)]$ is a parameter that takes a value that is greater the greater the magnitude of the components other than the echo component, such as a near-end speaker component or disturbance, included in the frame of the current time and can be defined via Formula (9), for example.

[Math. 8]

$$\sigma[\hat{S}_i(\omega)] = \begin{cases} |\hat{S}_i(\omega)| & \text{if } |\hat{S}_i(\omega)| > \upsilon_1 \text{ and (or) } \underset{\omega}{\text{mean}}(|\hat{S}_i(\omega)|) > \upsilon_2 \\ 1 & \text{otherwise} \end{cases} \quad (9)$$

Here, $\upsilon_1$ and $\upsilon_2$ each represent a threshold and, in a case where the quantization bit number of the signal is 16 bit for example, $\upsilon_1=\upsilon_2=1000$. Also a fixed parameter may be used or a variable parameter may be used which is a value that increases the greater the magnitude of the input is of the reproduction signal spectrum $X_i(\omega)$, the sound pickup signal spectrum $Y_i(\omega)$, the echo cancellation signal spectrum $S^{\wedge}_i(\omega)$, and the like.

[Math. 9]

$$\underset{\omega}{\text{mean}}(|\hat{S}_i(\omega)|)$$

refers to the processing to average the absolute value of the echo cancellation signal spectrum $|S^{\wedge}_i(\omega)|$ in the frequency direction.

Formula (9) represents control to decrease the update amount of the acoustic coupling amount the greater the proportion of the component $|S^{\wedge}_i(\omega)|$ other than the echo component is when determining the amount of the acoustic coupling amount to update, only in a case where the proportion of the component $|S^{\wedge}_i(\omega)|$ other than the echo component is greater than the predetermined threshold va and the average value

[Math. 10]

$$\underset{\omega}{\text{mean}}(|\hat{S}_i(\omega)|)$$

of the frequency component of the component $|S^{\wedge}_i(\omega)|$ other than the echo component is greater than the predetermined threshold $\upsilon_2$. Formula (9) represents control to determine the update amount of the acoustic coupling amount without using the proportion of the component $|S^{\wedge}_i(\omega)|$ other than the echo component in a case where the proportion of the component $|S^{\wedge}_i(\omega)|$ other than the echo component is equal to or less than the predetermined threshold $\upsilon_1$ and the average value

[Math. 11]

$$\underset{\omega}{\text{mean}}(|\hat{S}_i(\omega)|)$$

of the frequency component of the component $|S^{\wedge}_i(\omega)|$ other than the echo component is equal to or less than the predetermined threshold $\upsilon_2$.

Note that formula (9) is set so that one of and(or), in other words, an and condition or an or condition, can be selected. When the step size is reduced, a large amount of time is needed for updating. Thus, in a case where there is a non-significant amount of disturbance, updating normally is considered to be more efficient, so the thresholds $\upsilon_1$, $\upsilon_2$ for whether or not to consider the effects of disturbance are provided, and a determination via an or condition can be performed to further relax the condition.

<Second Echo Power Calculation Unit 204>

The second echo power calculation unit 204 is the same as the first echo power calculation unit 104 except in terms of a portion of the input with the first acoustic coupling amount estimated value $|H^{\wedge}_{m,i}(\omega)|^2$ being substituted with a second acoustic coupling amount estimated value $|H^{\wedge}_{m,i}(\omega)|^2$ and in terms of output with the first echo power estimated value $|D^{\wedge}_i(\omega)|^2$ being substituted with a second echo power estimated value $|D^{\wedge}_i(\omega)|^2$. In other words, the second echo power calculation unit 204 is input with the reproduction signal spectrum $X_i(\omega)$ and the second acoustic coupling amount estimated value $|H{\sim}_{m,i}(\omega)|^2$ and calculates the second echo power estimated value $|D{\sim}_i(\omega)|^2$ via Formula (10) (step S204).

[Math. 12]

$$|\tilde{D}_i(\omega)|^2=\Sigma_{m=0}^{M-1}|\tilde{H}_{m,i-1}(\omega)|^2|X_{i-m}(\omega)|^2 \quad (10)$$

<Second Gain Calculation Unit 205>

The second gain calculation unit 205 is the same as the first gain calculation unit 105 except in terms of a portion of the input with the first echo power estimated value $|D^{\wedge}_i(\omega)|^2$ being substituted with a second echo power estimated value $|D{\sim}_i(\omega)|^2$ and in terms of output with the first gain coefficient $G_i(\omega)$ being substituted with the second gain coefficient $G{\sim}_i(\omega)$. In other words, the second gain calculation unit 205 is input with the second echo power estimated value $|D{\sim}_i(\omega)|^2$ and the sound pickup signal spectrum $Y_i(\omega)$ and calculates the second gain coefficient $G{\sim}_i(\omega)$ via Formula (11) (step S205).

[Math. 13]

$$\tilde{G}_i(\omega) = \frac{|Y_i(\omega)|^2 - |\tilde{D}_i(\omega)|^2}{|Y_i(\omega)|^2} \quad (11)$$

<Second Integration Unit 206>

The second integration unit 206 is the same as the first integration unit 106 except in terms of a portion of the input with the first gain coefficient $G_i(\omega)$ being substituted with the second gain coefficient $G^{\wedge}_i(\omega)$ and in terms of the output with the first echo cancellation signal spectrum $S^{\wedge}_i(\omega)$ being substituted with the second echo cancellation signal spectrum $S{\sim}_i(\omega)$. In other words, the second integration unit 206 integrates the second gain coefficient $G^{\wedge}_i(\omega)$ with the sound pickup signal spectrum $Y_i(\omega)$ and generates and outputs the second echo cancellation signal spectrum $S{\sim}_i(\omega)$ (step S206).

<Frequency Combining Unit 207>

The frequency combining unit 207 is the same as the frequency combining unit 107 except in terms of the input with the first echo cancellation signal spectrum $S^{\wedge}_i(\omega)$ being substituted with the second echo cancellation signal spectrum $S{\sim}_i(\omega)$. In other words, the frequency combining unit 207 recombines and outputs the output signal $\hat{s}(n)$ of the time domain from the second echo cancellation signal spectrum $\tilde{S}_i(\omega)$ corresponding to the frequency value $\omega$ (step S207).

<Advantages of Echo Cancellation Apparatus 200 of the First Embodiment>

According to the echo cancellation apparatus 200 of the first embodiment, when obtaining the acoustic coupling amount by shifting the reproduction signal spectrum with respect to the sound pickup signal spectrum to the past, the step size for determining the acoustic coupling amount estimation update amount is decreased the greater the magnitude of the near-end speaker component (echo cancellation signal spectrum) included in the frame of the current time is. Accordingly, with double talk, an incorrect estimation of the acoustic coupling amount can be prevented without using a double talk detector. Thus, even with double talk, incorrect estimations of the acoustic coupling amount can be reduced, and echo power can be estimated with high accuracy.

<Simulation Experiment Result>

The echo cancellation apparatus (echo cancellation method) of the first embodiment described above and a conventional method will now be compared. The method according to NPL 1 is used as the conventional method. To confirm the effectiveness of the echo cancellation apparatus (echo cancellation method) of the first embodiment, the echo cancellation apparatus (echo cancellation method) of the first embodiment and the conventional method were both applied to ER processing and the performances were compared. The placement of the speaker and microphone was in accordance with ITU-T Recommendation P.340. The reverberation time is approximately 300 ms, the sampling frequency is 16 kHz, the frequency band is from 100 Hz to 7 kHz.

In the experiment, talk at only the far-end (received single talk) and double talk were evaluated using different metrics. Received single talk was evaluated for the echo suppression amount using echo return loss enhancement (ERLE). The result of the experiment showed that the ERLE of both the echo cancellation apparatus (echo cancellation method) of the first embodiment and the conventional method was 26.32 dB. This result was due to, with the echo cancellation apparatus (echo cancellation method) of the first embodiment, $\sigma[\hat{S}_i(\omega)]$ equaled 1 with received single talk and the echo path power spectrum matched that of the conventional method.

Figure 4:
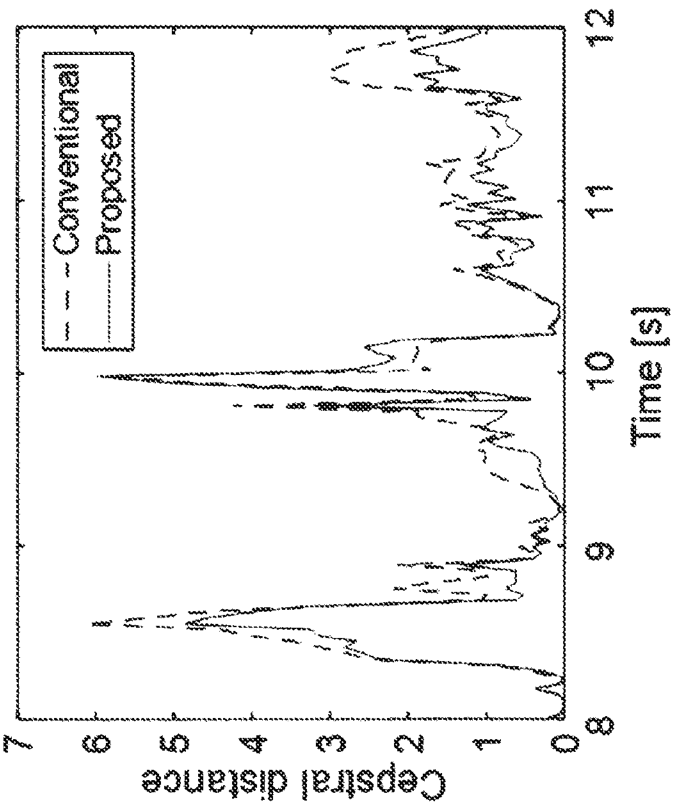
FIG. 4 is a graph comparing a conventional method and a method of the first embodiment in terms of the audio distortion amount when there is double talk.

With double talk, the distortion amount in the transmitted audio was evaluated using linear predictive coding (LPC) cepstral distance. FIG. 4 shows the comparison result. As seen from the result, according to the echo cancellation apparatus (echo cancellation method) of the first embodiment, the audio distortion amount with double talk can be reduced without degrading the echo suppression amount with received single talk.

<Supplement>

The apparatus of the present invention as a single hardware entity includes, for example, an input unit to which a keyboard or the like can be connected; an output unit to which a liquid crystal display or the like can be connected; a communication unit to which a communication apparatus (for example, a communication cable) capable to communicating outside of the hardware entity can be connected; a central processing unit (CPU) (may be provided with a cache memory, register, or the like); memory such as PAM or ROM; an external storage apparatus; and a bus for connecting the input unit, the output unit, the communication unit, the CPU, the PAM, the ROM, and the external storage apparatus in a manner allowing for data to be passed therebetween. Also, as necessary, the hardware entity may be provided with an apparatus (drive) capable of reading and writing on a storage medium such as a CD-ROM. An example of a physical entity provided with such hardware resources is a general-purpose computer.

In the external storage apparatus of the hardware entity, a program required for implementing the functions described above and data required for the program processing are stored (this is not limited to an external storage apparatus, and, for example, the program may be stored in a ROM, i.e., a read-only storage apparatus). Also, the data and the like obtained from the program processing is appropriately stored in a RAM, an external storage apparatus, or the like.

In the hardware entity, the programs stored in the external storage apparatus (or the ROM or the like) and the data required for the processing of the programs are loaded into the memory as necessary and interpreted and execute or processed by a CPU as appropriate. In this manner, the CPU implements the predetermined functions (the configuration requirements labelled as units, means, and the like described above).

The present invention is not limited to the embodiments described above, and modifications can be made, as appropriate, without departing from the scope of the present invention. Also, the processing in the embodiment described above is not limited to only being executed in the time series according to the order described above and may be executed in parallel or separately depending on the processing capability of the apparatus executing the processing or as necessary.

As described above, in a case where the processing functions of the hardware entity (apparatus of the present invention) according to the embodiment described above are implemented by a computer, the processing contents of the functions required by the hardware entity are described by a program. Then, by the computer executing the program, the processing functions of the hardware entity described above are implemented on the computer.

Figure 5:
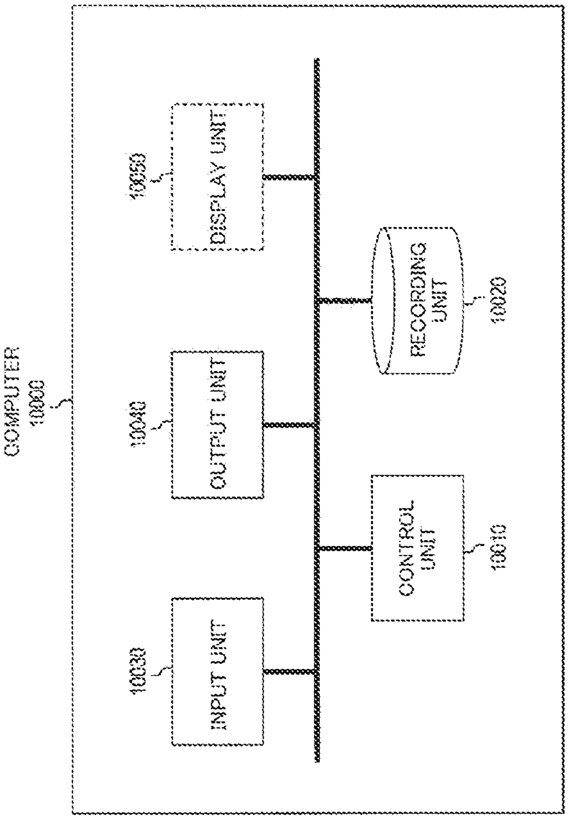
FIG. 5 is a diagram illustrating an example of the functional configuration of a computer.

The various types of processing described above can be executed by a program for executing the steps of the method described above being loaded on a recording unit 10020 of a computer illustrated in FIG. 5 and run on a control unit 10010, an input unit 10030, an output unit 10040, and the like.

The program with the described processing contents can be stored on a computer-readable storage medium. Examples of a computer-readable storage medium include, for example, a magnetic recording apparatus, an optical disk, a magneto-optical storage medium, a semiconductor memory, and the like. Specifically, for example, for the magnetic recording apparatus, a hard disk apparatus, a flexible disk, a magnetic tape, and the like can be used; for the optical disk, a digital versatile disc (DVD), a DVD random-access memory (RAM), a compact disc read-only memory (CD-ROM), a CD recordable (R)/rewritable (RW), and the like can be used, for the magneto-optical storage medium, a magneto-optical (MO) disc and the like can be used, and for the semiconductor memory, an electrically erasable and programmable read-only memory (EEP-ROM) and the like can be used.

Also, distribution of the program is performed, for example, by selling, transferring, or lending a portable storage medium, such as a DVD or CD-ROM on which the program is recorded. Furthermore, the program may be distributed by storing the program in a storage apparatus of a server computer and then transferring the program from the server computer to another computer via a network.

A computer for executing the program in this manner, for example, firstly temporarily stores a program stored in a portable storage medium or a program transferred from a server computer in its own storage apparatus. Then, when processing is executed, the computer reads the program stored in its own storage medium and executes processing in accordance with the read program. In another method of executing the program, a computer may read the program directly from a portable storage medium and execute the processing in accordance with the program, or each time the program is transferred to the computer from a server computer, processing is executed successively in accordance with the received program. Also, the processing described above may be executed by implementing processing functions via only an execution instruction and a result acquisition, without transferring the program from the server computer to the computer, in other words, via an application service, provider (ASP) service. Note that the program of the present embodiment includes information, data, and the like provided for the processing by an electronic computer that conform to the program (data and the like that are not a direct command for the computer but have characteristics specified by the processing of the computer).

Also, in this embodiment, the hardware entity is configured by executing a predetermined program on a computer. However, at least a portion of the processing contents may be implemented by hardware.

The invention claimed is:

1. An echo cancellation apparatus for cancelling an echo included in a sound pickup signal picked up by a microphone placed at a near-end, the apparatus comprises a processor configured to execute operations comprising:

calculating an acoustic coupling amount estimated value of a component of a reproduction signal, wherein the reproduction signal represents a sound signal picked up by a microphone placed at a far-end, and the calculating further comprises updating the acoustic coupling amount estimated value with a smaller amount as an update amount, as a magnitude of a component of the sound pickup signal other than an echo component of the sound pickup signal increases;

calculating a gain coefficient on the basis of the acoustic coupling amount estimated value; and generating, based on integrating the gain coefficient with the sound pickup signal, an echo cancellation signal.

2. The echo cancellation apparatus according to claim 1, wherein the calculating an acoustic coupling amount estimated value further comprises determining the update amount by controlling a step size in a case where a formula for obtaining the acoustic coupling amount estimated value is represented by an updated formula with the step size.

3. The echo cancellation apparatus according claim 2, wherein the acoustic coupling amount estimated value is calculated via $$|\tilde{H}_{m,i}(\omega)|^2 = \left| \frac{\mu_{i-m,\omega}}{\sigma[\hat{S}_i(\omega)]} \cdot \frac{Y_i(\omega)}{X_{i-m}(\omega)} + \left(1 - \frac{\mu_{i-m,\omega}}{\sigma[\hat{S}_i(\omega)]}\right) \tilde{H}_{m,i-1}(\omega) \right|^2$$

where, i is a frame number, m is a frame corresponding to an impulse response length of an echo path, ω is a frequency value, μ is the step size, S^(ω) is an echo cancellation signal spectrum, σ[S^(ω)] is a parameter that takes a value that increases as a magnitude of a component other than an echo component included in a frame of a current time increases, Y(ω) is a sound pickup signal spectrum, X(ω) is a reproduction signal spectrum, and |H~(ω)|$^2$ is the acoustic coupling amount estimated value.

4. The echo cancellation apparatus according to claim 1, wherein the calculating acoustic coupling amount estimated value further comprises:

decreasing the update amount of the acoustic coupling amount as a proportion of the component of the sound pickup signal other than the echo component increases when determining an amount to update of the acoustic coupling amount only in a case where a proportion of the component of the sound pickup signal other than the echo component is greater than a predetermined threshold and an average value of a frequency component of the component of the sound pickup signal other than the echo component is greater than a predetermined threshold, and determining an update amount of the acoustic coupling amount without using a proportion of the component of the sound pickup signal other than the echo component in a case where a proportion of the component of the sound pickup signal other than the echo component is equal to or less than a predetermined threshold or in a case where an average value of a frequency component of the component of the sound pickup signal other than the echo component is equal to or less than a predetermined threshold.

5. An echo cancellation method for cancelling an echo included in a sound pickup signal picked up by a microphone placed at a near-end, comprising:

calculating an acoustic coupling amount estimated value of a component of a reproduction signal, wherein the reproduction signal represents a sound signal picked up by a microphone placed at a far-end, and the calculating further comprises updating the acoustic coupling amount estimated value with a smaller amount as an update amount, as a magnitude of a component of the sound pickup signal other than an echo component is of the sound pickup signal increases;

calculating a gain coefficient on the basis of the acoustic coupling amount estimated value; and generating, based on integrating the gain coefficient with the sound pickup signal, an echo cancellation signal.

6. The echo cancellation apparatus according to claim 2, wherein the calculating an acoustic coupling amount estimated value further comprises:

decreasing the update amount of the acoustic coupling amount as a proportion of the component of the sound pickup signal other than the echo component increases when determining an amount to update of the acoustic coupling amount only in a case where a proportion of the component of the sound pickup signal other than the echo component is greater than a predetermined threshold and an average value of a frequency component of the component of the sound pickup signal other than the echo component is greater than a predetermined threshold, and determining the update amount of the acoustic coupling amount without using a proportion of the component of the sound pickup signal other than the echo component in a case where a proportion of the component of the sound pickup signal other than the echo component is equal to or less than a predetermined threshold or in a case where an average value of a frequency component of the component of the sound pickup signal other than the echo component is equal to or less than a predetermined threshold.

7. The echo cancellation apparatus according to claim 3, wherein the calculating an acoustic coupling amount estimated value further comprises:

decreasing the update amount of the acoustic coupling amount as a proportion of the component of the sound pickup signal other than the echo component increases when determining an amount to update of the acoustic coupling amount only in a case where a proportion of the component of the sound pickup signal other than the echo component is greater than a predetermined threshold and an average value of a frequency component of the component of the sound pickup signal other than the echo component is greater than a predetermined threshold, and determining an update amount of the acoustic coupling amount without using a proportion of the component of the sound pickup signal other than the echo component in a case where a proportion of the component of the sound pickup signal other than the echo component is equal to or less than a predetermined threshold or in a case where an average value of a frequency component of the component of the sound pickup signal other than the echo component is equal to or less than a predetermined threshold.

8. A system for cancelling an echo included in a sound pickup signal picked up by a microphone placed at a near-end comprising:

a processor; and a memory storing computer-executable instructions that when executed by the processor cause the system to perform a method, the method comprising:

calculating an acoustic coupling amount estimated value of a component of a reproduction signal, wherein the reproduction signal represents a sound signal picked up by a microphone placed at a far-end, and the calculating further comprises updating the acoustic coupling amount estimated value with a smaller amount as an update amount, as a magnitude of a component of the sound pickup signal other than an echo component is in the sound pickup signal increases;

calculating a gain coefficient on the basis of the acoustic coupling amount estimated value; and generating, based on integrating the gain coefficient with the sound pickup signal, an echo cancellation signal.

9. The system according to claim 8 wherein the calculating an acoustic coupling amount estimated value further comprises determining the update amount by controlling a step size in a case where a formula for obtaining the acoustic coupling amount estimated value is represented by an updated formula with the step size.

10. The system according to claim 9, wherein the acoustic coupling amount estimated value is calculated via $$|\tilde{H}_{m,i}(\omega)|^2 = \left| \frac{\mu_{i-m,\omega}}{\sigma[\hat{S}_i(\omega)]} \cdot \frac{Y_i(\omega)}{X_{i-m}(\omega)} + \left(1 - \frac{\mu_{i-m,\omega}}{\sigma[\hat{S}_i(\omega)]}\right) \tilde{H}_{m,i-1}(\omega) \right|^2$$

where, i is a frame number, m is a frame corresponding to an impulse response length of an echo path, ω is a frequency value, μ is the step size, S^(ω) is an echo cancellation signal spectrum, α[S^(ω)] is a parameter that takes a value that increases as a magnitude of a component other than an echo component included in a frame of a current time increases, Y(ω) is a sound pickup signal spectrum, X(ω) is a reproduction signal spectrum, and |H~(ω)|$^2$ is the acoustic coupling amount estimated value.

11. The system according to claim 8, wherein the calculating an acoustic coupling amount estimated value further comprises:

decreasing the update amount of the acoustic coupling amount as a proportion of the component other than the echo component increases when determining an amount to update of the acoustic coupling amount only in a case where a proportion of the component of the sound pickup signal other than the echo component is greater than a predetermined threshold and an average value of a frequency component of the component of the sound pickup signal other than the echo component is greater than a predetermined threshold, and determining an update amount of the acoustic coupling amount without using a proportion of the component of the sound pickup signal other than the echo component in a case where a proportion of the component of the sound pickup signal other than the echo component is equal to or less than a predetermined threshold or in a case where an average value of a frequency component of the component of the sound pickup signal other than the echo component is equal to or less than a predetermined threshold.

12. The system according to claim 9, wherein the calculating an acoustic coupling amount estimated value further comprises:

decreasing the update amount of the acoustic coupling amount as a proportion of the component of the sound pickup signal other than the echo component increases when determining an amount to update of the acoustic coupling amount only in a case where a proportion of the component of the sound pickup signal other than the echo component is greater than a predetermined threshold and an average value of a frequency component of the component of the sound pickup signal other than the echo component is greater than a predetermined threshold, and determining the update amount of the acoustic coupling amount without using a proportion of the component of the sound pickup signal other than the echo component in a case where a proportion of the component of the sound pickup signal other than the echo component is equal to or less than a predetermined threshold or in a case where an average value of a frequency component of the component of the sound pickup signal other than the echo component is equal to or less than a predetermined threshold.

13. The system according to claim 10, wherein the calculating an acoustic coupling amount estimated value further comprises:

decreasing the update amount of the acoustic coupling amount as a proportion of the component of the sound pickup signal other than the echo component increases when determining an amount to update of the acoustic coupling amount only in a case where a proportion of the component of the sound pickup signal other than the echo component is greater than a predetermined threshold and an average value of a frequency component of the component of the sound pickup signal other than the echo component is greater than a predetermined threshold, and determining the update amount of the acoustic coupling amount without using a proportion of the component of the sound pickup signal other than the echo component in a case where a proportion of the component of the sound pickup signal other than the echo component is equal to or less than a predetermined threshold or in a case where an average value of a frequency component of the component of the sound pickup signal other than the echo component is equal to or less than a predetermined threshold.

* * * * *